United States Patent

Waldo et al.

[11] Patent Number: 5,984,416
[45] Date of Patent: Nov. 16, 1999

[54] ADJUSTABLE ARMREST

[75] Inventors: Stacey A. Waldo, Grand Haven, Mich.; Rachel A. teBrake, Hilton Head Island, S.C.; Allison R. Stahl, Holland; David J. Spykerman, Zeeland, both of Mich.

[73] Assignees: Calvin College, Green Rapids, Mich.; Prince Corporation, Holland, Mich.

[21] Appl. No.: 09/069,915

[22] Filed: Apr. 30, 1998

[51] Int. Cl.⁶ .................................................... A47C 7/54
[52] U.S. Cl. ............................... 297/411.38; 297/411.32; 297/411.35
[58] Field of Search .............................. 297/411.38, 115, 297/411.21, 411.3, 411.32, 411.34, 411.35, 411.45

[56] References Cited

U.S. PATENT DOCUMENTS

| | | |
|---|---|---|
| 3,116,093 | 12/1963 | Bosack . |
| 4,141,586 | 2/1979 | Goldner et al. . |
| 4,230,414 | 10/1980 | Cheshire . |
| 4,270,798 | 6/1981 | Harder, Jr. ...................... 297/411.35 X |
| 4,310,196 | 1/1982 | Vogel . |
| 4,435,011 | 3/1984 | Hakamata . |
| 4,496,190 | 1/1985 | Barley . |
| 4,655,501 | 4/1987 | Ishigami et al. . |
| 4,946,226 | 8/1990 | Hurn . |
| 4,978,171 | 12/1990 | Tateyama . |
| 5,076,645 | 12/1991 | Yokota . |
| 5,106,160 | 4/1992 | Nomura et al. . |
| 5,188,423 | 2/1993 | Meiller et al. . |
| 5,290,087 | 3/1994 | Spykerman . |
| 5,320,415 | 6/1994 | Krebs . |
| 5,489,143 | 2/1996 | Adachi et al. . |
| 5,702,157 | 12/1997 | Hurite . |
| 5,769,496 | 6/1998 | Gryp .................................. 297/411.32 |

FOREIGN PATENT DOCUMENTS

| | | |
|---|---|---|
| 1580260 | 9/1969 | France . |
| 2696387 | 4/1994 | France . |
| 56-112332 | 9/1981 | Japan . |
| 4361708 | 12/1992 | Japan . |
| 6141949 | 5/1994 | Japan . |
| 6141950 | 5/1994 | Japan . |
| 406191337 | 7/1994 | Japan ................................. 297/411.38 |
| 1256977 | 12/1971 | United Kingdom . |

OTHER PUBLICATIONS

Exhibit A is a drawing of a prior art adjustable armrest.

*Primary Examiner*—Laurie K. Cranmer
*Attorney, Agent, or Firm*—Price, Heneveld, Cooper, DeWitt & Litton

[57] ABSTRACT

An adjustable armrest for a vehicle includes a molded shell and a blocking member, both rotatably mounted to a pivot pin that is attached to a vehicle such as to the seat. The shell houses a linearly operating control mechanism that allows the armrest to be adjusted to a variety of positions, yet remember an initially selected position. The blocking member has an abutment surface that is positioned to normally engage a stop pin that is fixedly mounted to the vehicle for limiting the range of rotational movement of the armrest. In the preferred embodiment, the control mechanism has a first end including an interlocking member adapted to normally interengage the blocking member, and a second end opposite the first end that may be actuated by the user to selectively release the interengagement between the blocking member and the interlocking member.

22 Claims, 3 Drawing Sheets

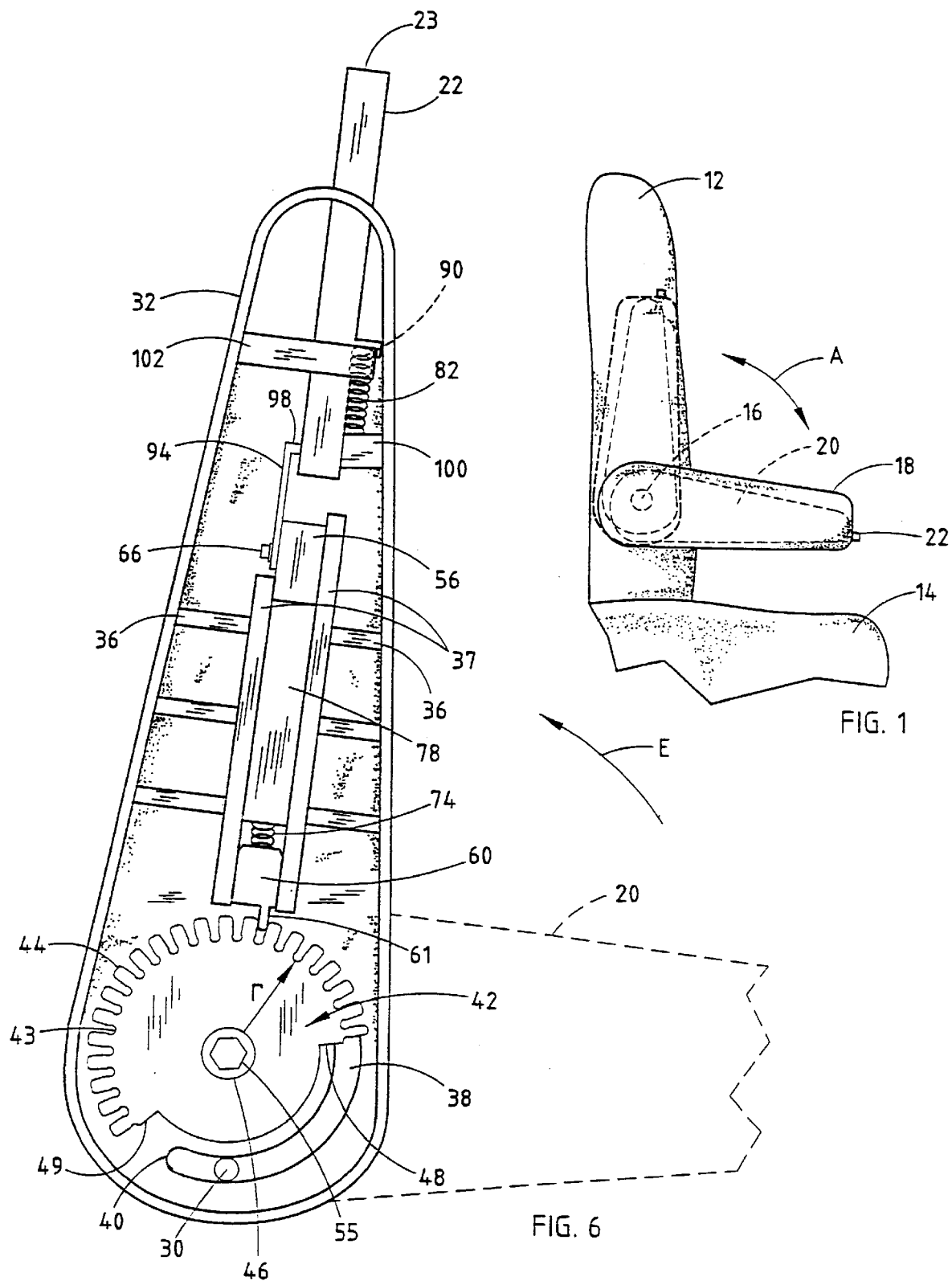

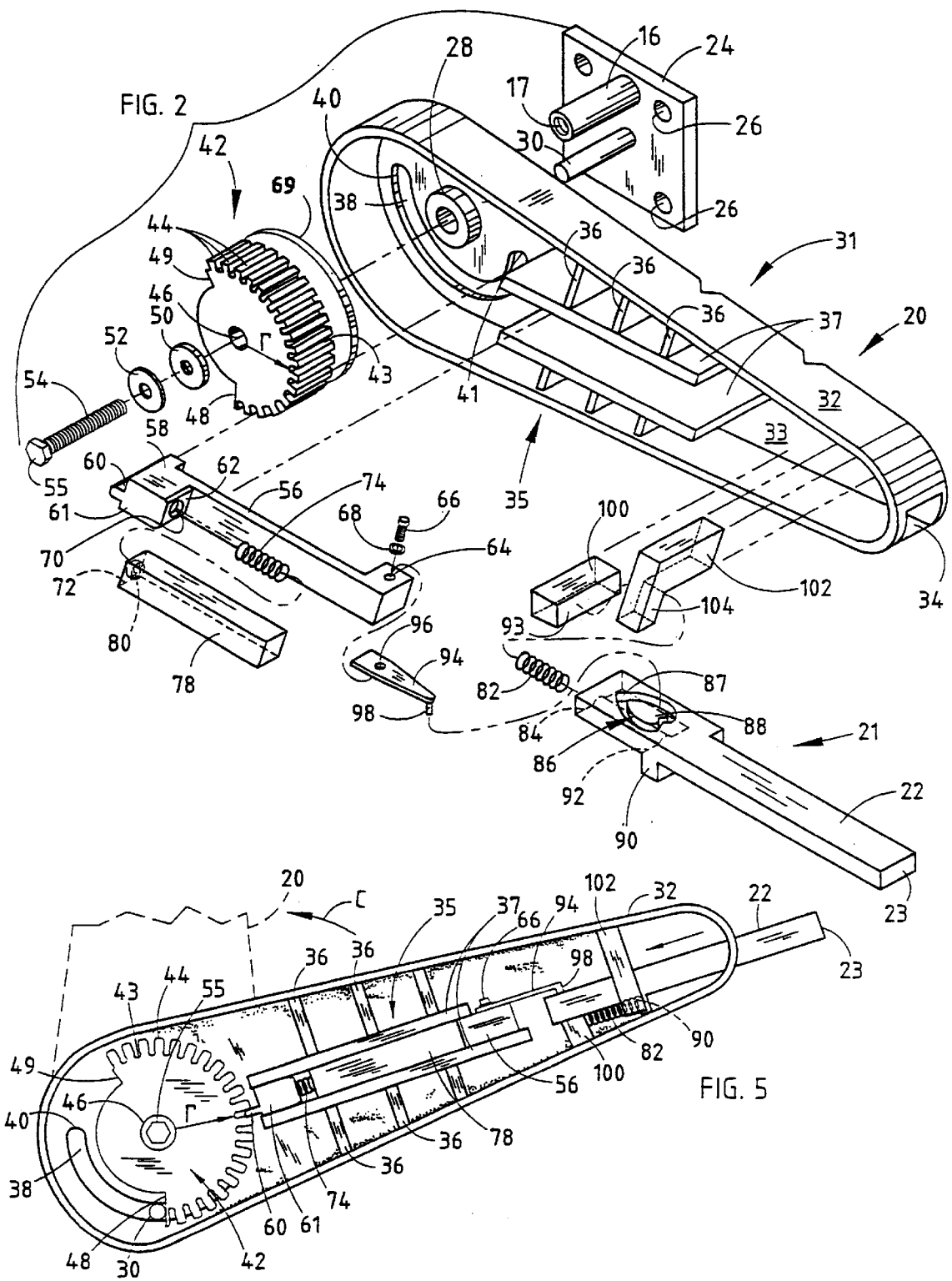

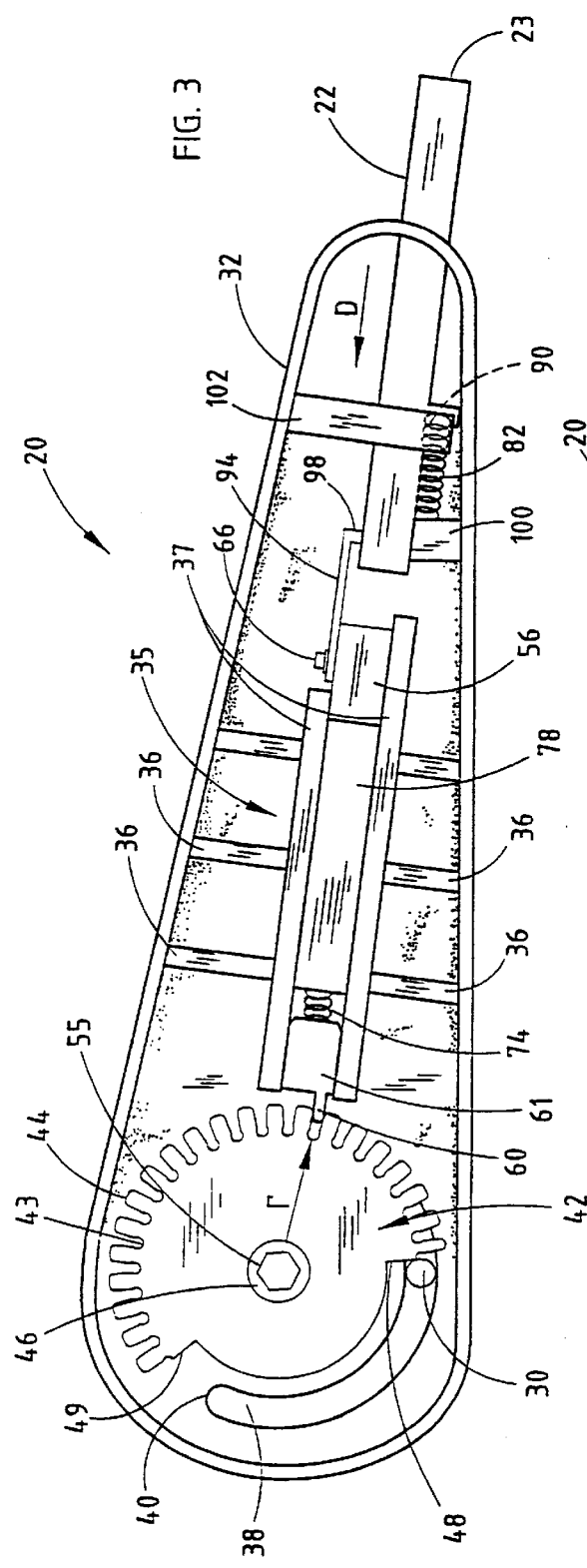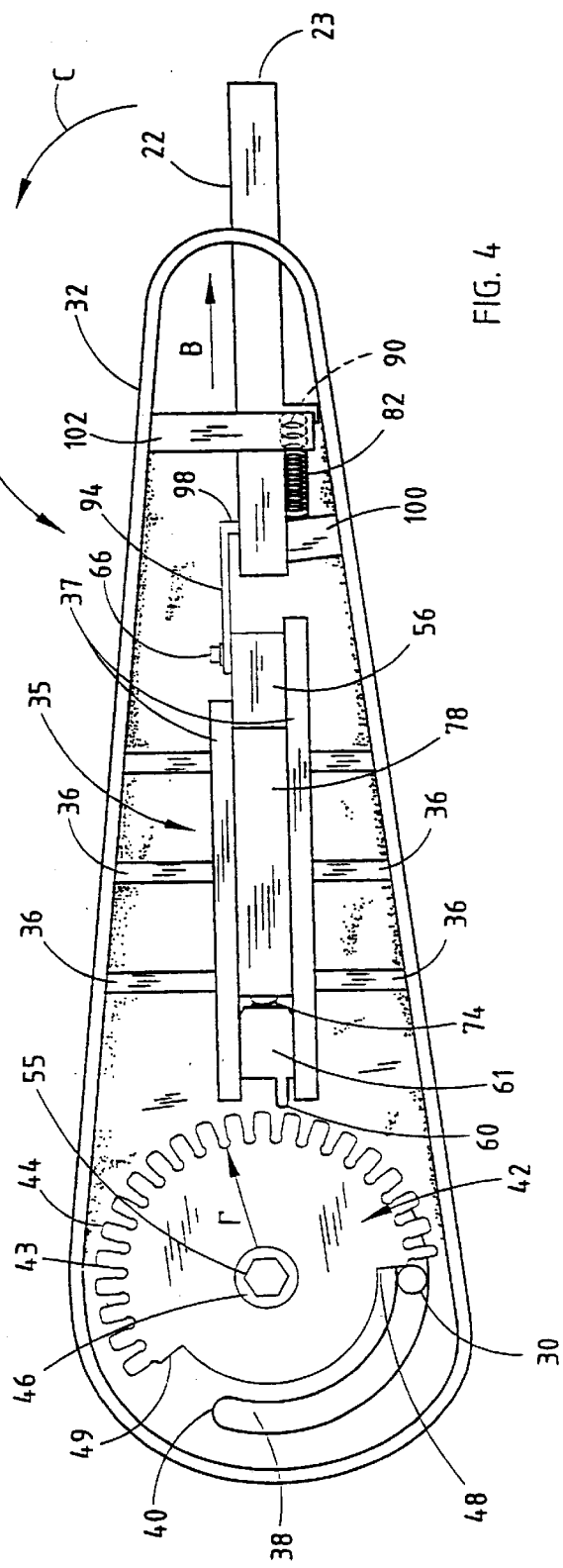

ADJUSTABLE ARMREST

BACKGROUND OF THE INVENTION

The present invention pertains to an adjustable armrest for a seat and one which can be used in a vehicle such as an automobile.

Vehicle armrests are of various constructions and include a wide range of user-friendly features. Known adjustable armrests typically include some type of manually controlled mechanism for allowing the user to adjust and lock the armrest at a desired position. This is useful when multiple drivers/passengers will be using the vehicle because, for example, while one person may prefer driving with their seat in an upright position, another person may enjoy a more reclined driving arrangement. Even if only one individual is using the vehicle, that individual may want to adjust the seat depending on, for example, the length of the trip and, therefore, may want to position the associated armrest accordingly.

The control mechanisms of known adjustable armrests typically incorporate some type of complex linkage or ratchet system that controls the engagement of, for example, two interlocking parts that allow the user to rotate the armrest and lock the armrest at a desired position. Not only are these known armrests complex, they are difficult to adjust, expensive to manufacture, and, typically, provide only a few positions at which they may be set.

Further, if the user wants to move the armrest from a selected "favored" position to a secondary position, e.g., when the user wishes to move the armrest out of the way to reach an article in the backseat, the user usually must operate the control mechanism. This operation is cumbersome, inconvenient and inefficient. Also, while various armrest constructions provide desirable armrests for their intended purposes, adjustable armrests that allow the user to selectively change the "favored" position are awkward and difficult to manipulate, typically requiring some type of threaded rod mechanism to adjust the armrest. Further, because the control mechanisms of known adjustable armrests are expensive and complicated, an armrest is desired that incorporates a control mechanism which is relatively inexpensive to manufacture and intuitive to operate.

SUMMARY OF THE INVENTION

The adjustable armrest of the present invention provides an efficiently-designed, user-friendly armrest that includes a memory feature for "remembering" the user's favored position after being moved to a secondary position. The armrest design of the present invention accomplishes these objectives by providing a molded shell having a side with a socket formed therein for rotatably mounting the shell to a pivot pin for rotation of the armrest in a vertical plane. The molded shell also has an arcuate slot formed in its side for receiving a stop pin which, like the pivot pin, can be fixedly mounted to the seat or other vehicle support. As the armrest is rotated, the stop pin rides in the slot which limits the rotational movement of the armrest. The armrest includes structure for effectively changing the arcuate length of the slot to provide an adjustable arc of movement of the armrest between a first position and a selected arc "memory" position.

In the preferred embodiment, the armrest shell includes a control mechanism having two ends, an operating end extending outwardly from an opening in the molded shell and a locking end opposite the operating end and having an interlocking member that is adapted to selectively engage teeth of a gear at the user's favored position. The gear, like the shell, is rotatably mounted to the pivot pin and includes angularly spaced abutment surfaces for selectively engaging the stop pin. The control mechanism is responsive to manual manipulation of its operating end such that, when the operating end is depressed, the control mechanism causes linear movement of the interlocking member to selectively engage the gear and change the position of the gear with respect to the slot thereby selectively controlling the adjusted position of the armrest.

According to a method of adjusting an armrest consistent with the instant invention, an adjustable armrest having the features described immediately above is provided. By depressing the operating end of the control mechanism a first time, the first and second interlocking members separate to allow the armrest to be freely rotated to a favored position. Thereafter, by depressing the operating end a second time, the second interlocking member engages the first interlocking member to lock the armrest at the user's favored position.

If the user wants to move the armrest to a second position, e.g., to a position adjacent the back of the seat to reach another area of the interior of the vehicle, and then back to the favored position, the user may do so without being concerned about having to relocate the favored position. The user can readily rotate the armrest back to the initially selected favored position without further operating the control mechanism because, after the first and second interlocking members are locked at the user's favored position, the members maintain an interlocked relationship, even when the armrest is rotated to the secondary position.

As a result, the instant armrest is particularly useful in situations in which the armrest is likely to be moved, yet where the user wishes to retain a favored position. Further, the above-described method of operation of the control mechanism is intuitive to the user, thus permitting the user to readily adjust the armrest each time a new favored position is desired. These and other features, advantages and objects of the present invention will be further understood and appreciated by those skilled in the art by reference to the following specification, claims and appended drawings.

BRIEF DESCRIPTION OF THE DRAWINGS

FIG. 1 is a fragmentary, side elevational view of the interior of a vehicle including a seat and showing an armrest embodying the present invention;

FIG. 2 is an exploded, perspective view of an adjustable armrest embodying the present invention;

FIG. 3 is a side elevational view of the assembled armrest shown in FIG. 2, shown with the side removed and showing the armrest mechanism locked in a memorized favored position;

FIG. 4 is a side elevational view of the armrest of FIG. 3, showing the armrest mechanism released to allow adjustment to a different memory position;

FIG. 5 is a side elevational view similar to FIGS. 3 & 4, showing the armrest mechanism locked in a different memorized favored position; and FIG. 6 is a side elevational view of the armrest of FIGS. 3–5, showing the armrest rotated to a secondary position after having been locked at a favored position.

DETAILED DESCRIPTION OF PREFERRED EMBODIMENT

Referring initially to FIGS. 1 & 2, there is shown a vehicle seat 10 having a seat support 14 and a seat back 12 attached thereto. Seat 10 can be of conventional design having a framework included within seat back 12 that includes structure for attaching a mounting plate 24 (FIG. 2) thereto with, e.g., bolts adapted to engage holes 26 in plate 24 and holes (not shown) formed in seat back 12. Alternatively, plate 24 can extend from the floor of a vehicle where the armrest is attached to the vehicle floor between seats as opposed to being attached to the seat. In the preferred embodiment, seat 10 includes an armrest assembly 20 which is rotatably mounted to a pivot pin 16 that is fixedly secured to mounting plate 24. Pin 16 supports armrest assembly 20 such that armrest assembly 20 may be rotated, as seen by arrow "A" in FIG. 1, in an arc relative to seat back 12 between first and second positions. Armrest assembly 20 also includes a cover 18, preferably made from a foam substrate suitably upholstered to at least partially enclose armrest 20 for user comfort and aesthetic appeal.

With further reference to FIG. 1, armrest 20 includes a spring loaded control button 22 that may be depressed by the user for locking/unlocking armrest 20 and for adjusting the memorized second position of armrest 20. Armrest 20 can be rotated from the initially-selected favored position to a secondary position, for example, adjacent seat back 12 as shown in phantom. Also, armrest 20 can be rotated back to the memorized favored position without further manipulation of button 22, as described in detail below.

With further reference to FIG. 2, adjustable armrest 20 includes a molded shell 31 having a side 33 and an outer peripheral wall 32 having an opening 34 through which button 22 extends. Side 33 of shell 31 includes a pivot pin receiving boss or socket 28 for receiving pivot pin 16 and allowing shell 31 to rotate about pin 16. In the preferred embodiment, button 22 is an integral part of a control mechanism 21. To accommodate control mechanism 21, shell 31 extends longitudinally and includes a mounting structure 35 and support blocks 100, 102 for supporting and guiding control mechanism 21. More particularly, elongated button 22 is held within adjustable armrest 20 by guide block 102 which has a surface 104 that allows linear sliding movement of button 22. Mounting structure 35 is preferably molded within shell 31 and includes U-shaped transverse ribs 36 and spaced-apart longitudinal ribs 37 that are molded to ribs 36. Longitudinal ribs 37 guide the components of control mechanism 21 for smooth linear sliding movement.

Control mechanism 21 also includes a bar 56 having an interlocking end member 58 and a toggle 94 which, along with elongated button 22, are linearly connected. Toggle 94 is rotatably mounted to bar 56 by aligning a threaded hole 64 of bar 56 with a corresponding hole 96 of toggle 94 and connecting the two with a screw 66 containing a washer 68. Toggle 94 also includes a tab 98 that extends outwardly and generally perpendicularly from an end opposite hole 96. Tab 98 of toggle 94 is adapted to ride in a track 86 formed in elongated control button 22 which is preferably molded of a polymeric material. A catch 88 is formed within track 86 and is adapted to receive tab 98 as control mechanism 21 is operated. This push—push latch mechanism is generally well-known and employed to selectively hold the armrest in memory position or an adjustment position upon successive depressions of end 23 of control 22 as described in further detail in connection with FIG. 4. Elongated button 22 also includes an outwardly-extending perpendicular ledge 90 having a flat surface 92 for accommodating a spring 82 which biases button 22 outwardly from opening 34 in shell 31.

Adjustable armrest 20 also includes a blocking member 42, preferably a gear having a plurality of teeth 44 and a hub 46. When armrest 20 is assembled, hub 46 of gear 42 and pivot pin receiving socket 28 of shell 31 are mounted to pivot pin 16, separated by a washer 69, such that both are independently rotatable. Also, armrest 20 includes means for retaining shell 31 and gear 42 on pivot pin 16. In particular, pivot pin 16 includes a threaded central bore 17 adapted to accommodate a threaded bolt 54 for securing shell 31 and gear 42 to pivot pin 16. Washers 50, 52 made of preferably nylon and steel, respectively, are positioned between bolt head 55 and hub 46 for smooth rotational movement of armrest 20.

Teeth 44 of gear 42 are adapted to interlock with an interlocking element 60 (preferably consisting of at least one tooth-like structure) extending outwardly from a surface 61 of interlocking end member 58 of control mechanism 21 as shown in FIG. 3. As assembled, interlocking element 60 extends toward gear 42 for readily engaging a space 43 between two adjacent teeth 44.

Gear 42 is partially cut-away such that approximately 150 degrees of the gear is removed, thus creating a radial open edge with ends defining abutment surfaces 48 and 49. When assembled, abutment surface 48 normally engages a stop pin 30 that is adapted to slide in an arcuate slot 38 formed in side 33 of shell 31 to limit the range of rotational movement of armrest 20. Slot 38 extends through an arc of about 180 degrees and, as will become apparent, the motion of slot 38 about fixed stop pin 30 can be selectively restricted by the adjustment of the memory position of gear 42 which can selectively occlude part of the slot 38 thereby limiting the motion of armrest 20. Stop pin 30 is secured to mounting plate 24, generally parallel to and spaced from pivot pin 16.

When adjustable armrest 20 is assembled but not locked at a favored position, as seen in FIG. 4, shell 31 may be rotated freely, independent of gear 42, within a range defined by the arcuate length of slot 38. More particularly, slot 38 includes closed ends 40, 41 that are adapted to abut stop pin 30 thus limiting the range of rotational movement of shell 31. Preferably, slot 38 extends approximately 180 degrees thus allowing armrest 20 (when not locked at a favored position) to be rotated approximately 180 degrees. As shell 31 is rotated, gear 42 remains stationary relative to pin 16 because the weight of gear 42 is substantial relative to shell 31 and the two are separated by washer 69. To insure that gear 42 remains stationary when the armrest is not locked at a desired position and shell 31 is rotated, gear 42 may be detented or a torque washer may be provided. On the other hand, when armrest 20 is locked at a favored position (FIGS. 3 & 5), pin 30 will stop downward rotational movement of the armrest, including gear 42, when stop pin 30 engages surface 48 of gear 42. The control mechanism 21 which changes the position of gear 42 relative to slot 38 is now further described.

Armrest 20 includes an elongated block 78, which extends between ribs 37, preferably by press-fitting between longitudinal ribs 37. Block 78 prevents bar 56 from laterally separating from mounting structure 35. Also, longitudinal block 78 and longitudinal ribs 37 together allow sliding movement of bar 56 therebetween. When assembled, bar 56 (including interlocking element 60), toggle 94 and button 22 are in radial alignment with gear 42 for engagement between interlocking element 60 and teeth 44 as control mechanism 21 is operated (FIGS. 3–5). A spring 82 is positioned between surface 92 of outwardly-extending portion 90 of button 22 and surface 93 of block 100, and within a longitudinal notch 84 formed in button 22. As mentioned previously, spring 82 acts to bias elongated button 22 outwardly from opening 34 in outer surface 32 of shell 31 such that end 23 of button 22 is exposed to the user for manipulation of control mechanism 21. In addition, a spring 74 is connected between a surface 62 of interlocking end member 58 and a surface 72 of guide block 78. Preferably, surface 62 contains a depression 70 formed therein for receiving one end of spring 74 while the opposite end of spring 74 is held in a similar depression 80 formed in surface 72 of guide block 78. Spring 74 acts to normally bias bar 56, and particularly interlocking element 60, toward gear 42.

Notably, when armrest 20 is not locked (FIG. 4), shell 31 will rotate independent of gear 42, but when armrest 20 is locked (FIGS. 3 & 5), gear 42 is capable of rotating only in conjunction with shell 31. This aspect of the preferred embodiment adds the memory feature, discussed in further detail below in connection with FIG. 6. The operation of adjustable armrest 20 is shown in FIGS. 3–6 as now described.

FIG. 3 shows the component parts of FIG. 2 in their assembled state with armrest 20 locked in an initially-selected favored position (somewhat lowered from a horizontal position). Shell 31 of armrest 20 is rotatably mounted to seat back 12 (FIG. 1) such that socket 28 and slot 38 accommodate pivot pin 16 and stop pin 30, respectively. Further, as described above, gear 42 is mounted to pivot pin 16 such that open edge 48 of gear 42 abuts stop pin 30 in this lowered position.

When armrest 20 is locked (FIG. 3), spring 74, which is connected between elongated block 80 and surface 62 of interlocking end member 58, biases bar 56 linearly away from open end 34 of armrest 20 to interlock element 60 of interlocking end member 58 between teeth 44 of gear 42. Also, tab 98 rests against end 87 (FIG. 2) of track 86, thus allowing spring 74 to move bar 56 with element 60 into teeth 44 of gear 42.

To select a favored position, the user initially depresses end 23 of button 22 to disengage interlocking end member 58 from gear 42 as shown in FIG. 4. By depressing button 22, button 22 initially moves linearly toward gear 42 thus causing spring 82 to compress while toggle 94 rotates about hole 64 and tab 98 of toggle 94 rides in track 86. When button 22 is released, tab 98 engages catch 88 and the force stored in compressed spring 82 causes button 22 to move linearly outwardly from hole 34 in shell 31, depicted by arrow "B." In addition, button 22 pulls toggle 94, and bar 56 attached thereto, away from gear 42 and, therefore, causes interlocking element 60 to disengage teeth 44. As a result, spring 74 compresses and is held in a compressed state between surface 62 and surface 72. With armrest 20 in the position shown in FIG. 4, the user can freely rotate adjustable armrest 20, for example, upwardly as shown by arrow "C" in FIGS. 4 & 5, to a new favored position while gear 42 remains stationary with its abutment surface 48 abutting stop pin 30.

After actuating button 22, the user depresses end 23 of elongated button 22 a second time thus compressing spring 82 and allowing the force stored in compressed spring 74 to move bar 56, toggle 94 and button 22 together in line with a radius "r" of gear 42, i.e., in a direction depicted by arrow "D" (FIG. 3). As a result, interlocking element 60 of bar 56 engages gear 42 to lock armrest 20 at the user's new desired position (FIG. 5). Notably, this new desired position may be adjacent seat back 12 such that armrest 20 is conveniently locked out of the user's way. When the user releases end 23 of elongated button 22, tab 98 of toggle 94 releases from catch 88, and compressed spring 82 expands, thus causing button 22 (but not bar 56) to move in direction "B." Further, tab 98 rides within track 86 before abutting end 87.

Upon locking adjustable armrest 20 at one of the user's favored positions (shown in phantom in FIG. 6), the user may rotate adjustable armrest 20 (in a direction "E" in FIG. 6) to a secondary position, e.g., to a vertical position adjacent seat back 12 of seat 10 (shown in FIG. 6 and in phantom in FIG. 1). When doing so, gear 42 will correspondingly rotate with armrest 20 and will remain locked to interlocking end member 58 of control mechanism 21 at the user's initially selected position. To prevent unwanted swinging of armrest 20 when moved to a secondary position, armrest 20 may include a torque control such as that illustrated in U.S. Pat. No. 4,953,259 issued on Sep. 4, 1990, to Frye et al., and entitled ARMREST TORQUE CONTROL. After moving adjustable armrest 20 to a raised position, the user may return adjustable armrest 20 back to the selected favored position as seen in FIG. 5 slightly above the horizontal position, by merely rotating the armrest, i.e., without having to further operate control mechanism 21 and relocate that position.

Thus, when the user locks armrest 20 at a favored position, abutment surface 48 of gear 44 engages stop pin 30. When the user rotates armrest 20 to a secondary position from the favored position, gear 42 rotates with shell 31 of armrest 20, i.e., interlocking element 60 of control mechanism 21 remains locked to teeth 44 of gear 42 that correspond to the user's favored position. When the user rotates armrest 20 back toward its favored position, shell 31 and gear 42 will rotate together until pin 30 engages abutment surface 48 of gear 42, thus stopping the rotational movement of the armrest at the favored position. As a result, adjustable armrest 20 "remembers" the user's initially selected favored position. Preferably, gear 42 is made of steel. Also, for ideal interlocking between gear 42 and tooth 60, gear 42 is preferably a commonly-available saw or square tooth gear.

The above description is considered that of the preferred embodiments only. Modifications of the invention will occur to those skilled in the art and to those who make or use the invention. Therefore, it is understood that the embodiments shown in the drawings—and described above are merely for illustrative purposes and not intended to limit the scope of the invention, which is defined by the following claims as interpreted according to the principles of patent law, including the doctrine of equivalents.

The invention claimed is:

1. An adjustable armrest for pivotally mounting to a pivot pin extending from a vehicle seat which includes a stop pin fixedly mounted to the seat in spaced relationship to the pivot pin, said armrest comprising:

a molded shell for rotatably mounting to the pivot pin, said shell having an arcuate slot formed therein for receiving said stop pin to limit the rotational movement of said armrest about the pivot pin; and a blocking member which is adjustably mounted to said shell at a location to extend over said arcuate slot for selectively occluding said arcuate slot and contacting said stop pin for limiting the rotation of said shell with respect to the seat to allow said armrest to move between selected raised and lowered positions.

2. An adjustable armrest as defined in claim 1 wherein said shell further includes an interlocking member mounted therein, and said blocking member is rotatably mounted to the pivot pin wherein said blocking member engages said interlocking member such that said blocking member and said shell can rotate about the pivot pin when said blocking member is engaged by said interlocking member.

3. An adjustable armrest as defined in claim 2 wherein said blocking member is a cut-away gear having an abutment surface and a plurality of teeth, said gear rotatably mounted to the pivot pin such that said abutment surface of said gear can engage the stop pin.

4. An adjustable armrest as defined in claim 3 and further including a control mechanism mounted within said shell, said control mechanism having a locking end including said interlocking member defining an interlocking element, said locking element adapted to interengage said teeth of said gear, and an operating end opposite said locking end, said operating end extending outwardly from said shell; wherein said control mechanism is responsive to actuation of said operating end to control the interengagement between said interlocking element and said teeth of said gear for locking the armrest at a favored position.

5. An adjustable armrest as defined in claim 4 wherein said shell includes a plurality of transverse and longitudinal ribs for supporting said control mechanism and guiding the sliding movement of said control mechanism.

6. An adjustable armrest for pivotally mounting to a pivot pin extending from a vehicle seat which includes a stop pin fixedly mounted to the seat in spaced relationship to the pivot pin, said armrest comprising:
 a molded shell for rotatably mounting to the pivot pin, said shell having an arcuate slot formed therein for receiving said stop pin to limit the rotational movement of said armrest about the pivot pin;
 a blocking member which is adjustably mounted to said shell for selectively occluding said arcuate slot for selectively limiting the rotation of said shell with respect to the seat, wherein said shell further includes an interlocking member mounted therein, and said blocking member is rotatably mounted to the pivot pin wherein said blocking member engages said interlocking member such that said blocking member and said shell can rotate about the pivot pin when said blocking member is engaged by said interlocking member, and wherein said blocking member is a cut-away gear having an abutment surface and a plurality of teeth, said gear rotatably mounted to the pivot pin such that said abutment surface of said gear can engage the stop pin; and
 a control mechanism mounted within said shell, said control mechanism having a locking end including said interlocking member defining an interlocking element, said locking element adapted to interengage said teeth of said gear, and an operating end opposite said locking end, said operating end extending outwardly from said shell; wherein said control mechanism is responsive to actuation of said operating end to control the interengagement between said interlocking element and said teeth of said gear for locking the armrest at a favored position, wherein said shell includes a plurality of transverse and longitudinal ribs for supporting said control mechanism and guiding the sliding movement of said control mechanism; and wherein said control mechanism further includes a bar having a first end and a second end opposite said first end, said second end defining said locking end of said control mechanism; a toggle having a body rotatably attached to said first end of said bar and having a tab extending outwardly from and generally perpendicularly to said body; and a button having a free end defining said operating end of said control mechanism and having an opposite end that has a track formed therein and a catch extending within said track, said tab positioned to move within said track.

7. An adjustable armrest as defined in claim 6 further including a first spring positioned between a surface of said locking end of said control mechanism and a surface of an elongated block that is secured between said longitudinal ribs, said first spring biasing said interlocking member toward said gear.

8. An adjustable armrest as defined in claim 7 further including a second spring positioned between said button and said shell, said second spring for biasing said button outwardly from said opening of said shell such that when said free end of said button is depressed a first time, said tab rides in said track and engages said catch to disengage said locking element from said gear as said second spring linearly moves said control mechanism, including said free end of said button, outwardly from said opening in said shell, and when said free end of said button is depressed a second time, said tab is released from said catch as said first spring linearly moves said bar and causes said locking element to engage said gear at a selected armrest position.

9. An adjustable armrest as defined in claim 8 wherein a retaining means secures said shell and said gear on the pivot pin.

10. An adjustable armrest as defined in claim 6 wherein said shell is at least partially covered by a foam substrate.

11. An adjustable armrest as defined in claim 10 wherein said slot has a pair of closed ends, the stop pin adapted to engage said ends of said slot to limit the range of rotational movement of said shell.

12. An adjustable armrest as defined in claim 11 wherein said slot extends about 180°.

13. An adjustable armrest for pivotally mounting to a pivot pin attached to a vehicle, and a stop pin mounted to the vehicle generally parallel to and spaced from the pivot pin, said armrest comprising:
 a molded shell for rotatably mounting to the pivot pin, said shell having an arcuate slot formed therein for receiving the stop pin to limit the rotational movement of said armrest about the pivot pin; and
 a blocking member which is adjustably mounted to said shell for selectively occluding said arcuate slot for selectively limiting the rotation of said shell with respect to the seat, and further including a control mechanism mounted within said shell, said control mechanism including an elongated control member extending outwardly from said shell, said control mechanism also including a locking end having an interlocking element extending outwardly therefrom; and wherein said blocking member comprises a gear having a radial surface defining an abutment, said gear rotatably mounted to the pivot pin such that the stop pin normally engages said abutment, said gear also having a plurality of teeth for normally engaging said interlocking element, wherein said control mechanism is responsive to actuation of said control member to cause movement of said interlocking element to control the interengagement between said interlocking element and said teeth of said gear, and wherein said gear and said shell can rotate about the pivot pin when said gear is engaged with said interlocking element, wherein said slot is arcuate and extends about 180°.

14. An adjustable armrest as defined in claim 13 wherein said shell includes a plurality of ribs for supporting the sliding of said control mechanism.

15. An adjustable armrest as defined in claim 14 further including a first spring positioned between said locking end of said control mechanism and said shell, said first spring biasing said interlocking element toward said gear.

16. An adjustable armrest as defined in claim 15 further including a second spring positioned between said control member and said shell, said second spring for biasing said control member outwardly from said shell.

17. An adjustable armrest as defined in claim 16 wherein said control mechanism further includes:

a bar having a first end and a second end opposite said first end, said second end defining said locking end of said control mechanism;

a toggle having a body rotatably attached to said first end of said bar and having a tab extending outwardly from and generally perpendicularly to said body; and wherein said control member has a track formed therein and a catch extending within said track, said tab adapted to move within said track such that when said control member is pushed a first time said tab rides in said track and engages said catch to disengage said interlocking element from said gear as said second spring linearly moves said control mechanism, including said control member outwardly from said shell, and when said control member is pushed a second time, said tab is released from said catch as said first spring linearly moves said bar and causes said interlocking element to engage said gear at a selected position.

18. An adjustable armrest as defined in claim 13 wherein a retaining means secures said shell and said gear on the pivot pin.

19. An adjustable armrest as defined in claim 13 wherein said shell is at least partially covered by a foam substrate.

20. An adjustable armrest for a seat having a seat back with a pivot pin mounted generally perpendicular to the seat back, and a stop pin mounted to the seat generally parallel to the pivot pin, the armrest comprising:

a molded shell having a socket for rotatably mounting said shell to the pivot pin and an outer peripheral wall, said wall having an opening;

a control mechanism mounted within said shell, said control mechanism having an operating end that extends through said opening and having a locking end, said locking end having an interlocking member extending outwardly therefrom;

a slot formed in said shell for receiving the stop pin;

a cut-away gear having an abutment surface and a plurality of teeth, said teeth normally engaging said interlocking member, and said gear being rotatably mounted to the pivot pin such that the stop pin normally engages said abutment surface; and wherein said control mechanism is responsive to actuation of said operating end such that when said operating end is depressed a first time, said control mechanism causes linear movement of said interlocking member to disengage said interlocking member from said gear, and when said operating end is depressed a second time, said control mechanism causes linear movement of said interlocking member and causes said interlocking member to engage said gear at a selected position.

21. An adjustable armrest pivotally mounted to a pivot pin that is fixedly mounted to a seat, and a stop pin fixedly mounted to the seat generally parallel to and spaced from the pivot pin, said armrest comprising:

a molded shell rotatably mounted to the pivot pin, said shell having an arcuate slot formed therein for receiving the stop pin;

a cut-away gear having an abutment surface and a plurality of teeth, said gear being rotatably mounted to the pivot pin such that said abutment surface of said gear extends over said arcuate slot to abut the stop pin;

a control mechanism mounted within said shell, said control mechanism including an interlocking member adapted to engage said teeth of said gear and a button opposite said interlocking member, said control mechanism being responsive to actuation of said button to control the engagement between said gear and said interlocking member to change the position of said abutment surface of said gear with respect to said arcuate slot; and wherein said shell has a mounting structure for supporting and guiding said control mechanism, and wherein said gear and said shell are collectively rotatable about the pivot pin when said gear and said interlocking member are interengaged.

22. An adjustable armrest rotatably attached to a pivot pin that is fixedly attached to a vehicle seat and a stop pin mounted to the seat generally parallel to and in spaced relationship to the pivot pin, the armrest comprising:

a molded shell having a socket for rotatably mounting said shell to the pivot pin and an arcuate slot for receiving the stop pin;

a first interlocking member rotatably mounted to the pivot pin and having an abutment surface which extends over said arcuate slot for selectively occluding said arcuate slot and abutting the stop pin;

a linearly operating control mechanism mounted within said shell, said control mechanism including a button and a bar, said bar having a free end and a locking end opposite said free end, said free end extending outwardly from an opening in said shell and said locking end having a second interlocking member extending outwardly therefrom for engaging said first interlocking member; and wherein said control mechanism is responsive to actuation of said free end of said button to cause linear movement of said bar and hence control the interengagement between said first interlocking member and said second interlocking member such that said first interlocking member and said shell are collectively rotatable about the pivot pin when said first interlocking member is engaged with said second interlocking member.

* * * * *

UNITED STATES PATENT AND TRADEMARK OFFICE
CERTIFICATE OF CORRECTION

PATENT NO. : 5,984,416
DATED : November 16, 1999
INVENTOR(S) : Waldo et al.

It is certified that error appears in the above-identified patent and that said Letters Patent is hereby corrected as shown below:

Cover Page, [75] Inventors;

"Allison" should be --Alison--.

Cover Page, [73] Assignees;

"Green Rapids" should be --Grand Rapids--.

Signed and Sealed this

Twenty-fifth Day of July, 2000

Attest:

Q. TODD DICKINSON

Attesting Officer

Director of Patents and Trademarks